(No Model.)
G. WESTINGHOUSE, Jr.
ELECTRICAL CONVERTER.
No. 366,362. Patented July 12, 1887.
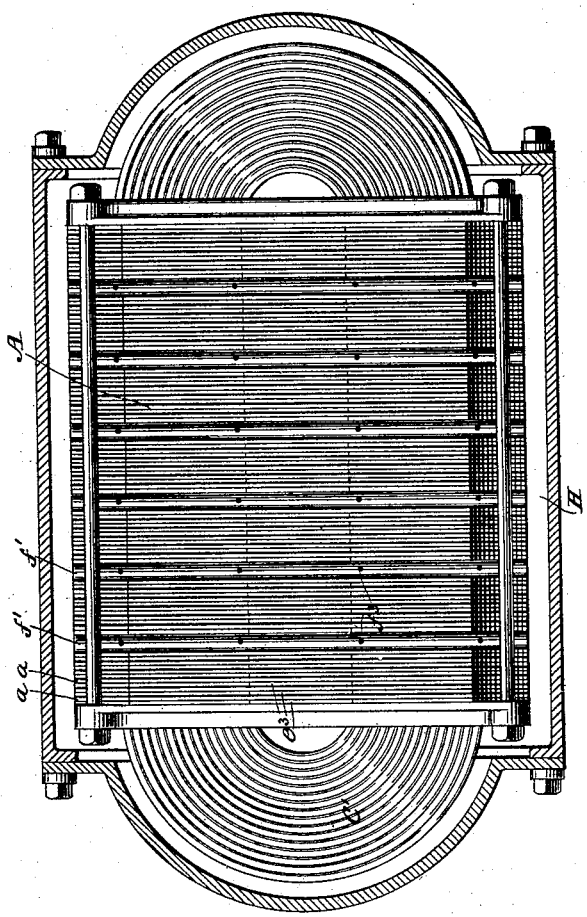
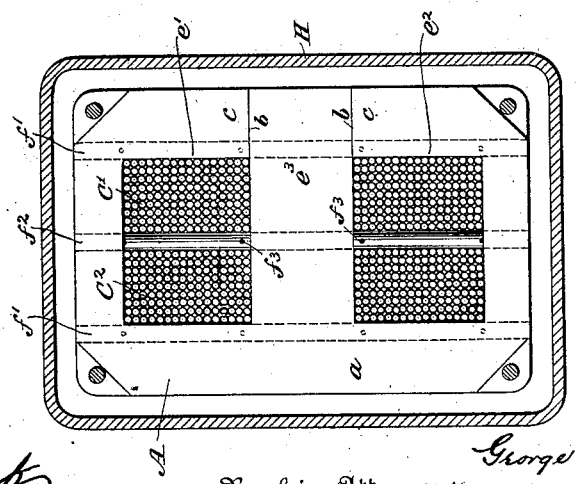
Witnesses
Geo. W. Breck
Carrie E. Ashley
Inventor
George Westinghouse Jr.
By his Attorneys
Pope & Edgcomb

United States Patent Office.

GEORGE WESTINGHOUSE, JR., OF PITTSBURG, PENNSYLVANIA.

ELECTRICAL CONVERTER.

SPECIFICATION forming part of Letters Patent No. 366,362, dated July 12, 1887.

Application filed December 27, 1886. Serial No. 222,556. (No model.)

*To all whom it may concern:*

Be it known that I, GEORGE WESTINGHOUSE, Jr., a citizen of the United States, residing in Pittsburg, in the county of Allegheny and State of Pennsylvania, have invented certain new and useful Improvements in Electrical Converters, of which the following is a specification.

The invention relates to the construction of a class of apparatus employed for transforming alternating or intermittent electric currents of any required character into currents differing therefrom in certain characteristics. Such apparatus are usually termed "induction-coils" or "converters."

The object of this invention is to provide a simple and efficient converter which will not become overheated when employed for a long time in transforming currents of high electro-motive force, and which will be thoroughly ventilated.

In the accompanying drawings, Figure 1 is a cross-section, and Fig. 2 is a longitudinal section, of a converter involving the features of the invention.

Referring to the figures, A represents the core of the converter, and $C'$ and $C^2$ the respective coils. The core is preferably composed of thin plates of soft iron $a\ a$, separated individually or in pairs from each other by thin sheets of paper or other insulating material. This insulating material is preferably applied to one surface of the plates by being glued or pasted thereto, and these surfaces may lie all in the same direction, thus separating the plates individually, or alternate plates may have their covered surfaces in one direction and the intervening plates have their covered faces in the opposite direction, thus magnetically separating the plates in pairs.

The plates are preferably constructed with two rectangular openings, $e'$ and $e^2$, through which the wires pass. For convenience in inserting the coils, or rather in applying the plates to the coils after the latter have been wound, a cut is made from each opening, as shown at $b\ b$. By bending the ends $c\ c$ upward the plates may then be thrust into position, and the ends $c\ c$ then close about the coils. The tongues $e^3$ of succeeding plates are preferably inserted from opposite sides. I do not, however, herein broadly claim an induction-coil having its core constructed of thin plates formed in the manner just described; but such invention is claimed in an application of even date herewith, filed by Albert Schmid. Each group of—say five or six—plates thus applied is preferably separated from the succeding group by air-spaces. These may be produced by passing tubes $f'\ f'$, which may be of soft iron or other metal, or of vulcanized fiber, along the lengths of the plates. It may be sufficient in other instances to block the group of plates apart at intervals instead of extending the tubes the entire length. Preferably also the primary and secondary coils $C'\ C^2$ are separated from each other in a similar manner. In this instance blocks or tubes $f^2$, of non-conducting material, are used. The tubes may be perforated, as shown at $f^3\ f^3$. Where the converter is to be used in open air, the tubes $f'$ and $f^2$ would permit a free circulation of air, and thus aid in keeping the converter cool.

It may be preferred in some instances to surround the converter with some oil or paraffine or other suitable material, which will assist in preserving insulation and will not be injured by heating. This material when in a liquid form circulates through the tubes and the intervening spaces of the coils and plates, and preserves the insulation, excludes the moisture, and cools the converter.

The entire converter may be sealed into an inclosing-case, H, which may or may not contain a non-conducting fluid or a gas.

I claim as my invention—

1. The combination, substantially as described, of a soft-iron core, and parallel primary and secondary coils having an open space intervening between them.

2. The combination, with the primary and secondary coils of an electric converter, of a core composed of laminæ of soft iron arranged in groups, said groups being separated by open spaces.

3. In an electrical converter, a core composed of soft-iron plates arranged in groups and open tubes intervening.

4. The combination, substantially as described, of an electric converter constructed with open spaces in its core, an inclosing-case, and a non-conducting fluid or gas in said case adapted to circulate through said spaces and about the converter.

5. The combination, with the primary and secondary coils of an electric converter, of a core composed of magnetically-separated laminæ of soft iron arranged in groups, the different groups being separated from each other by air-spaces, and the laminæ of the several groups being arranged in different parallel planes.

In testimony whereof I have hereunto subscribed my name this 27th day of October, A. D. 1886.

GEO. WESTINGHOUSE, JR.

Witnesses:
    CHARLES A. TERRY,
    WALTER D. UPTEGRAFF.